(12) United States Patent  (10) Patent No.: US 7,457,105 B2
Kikukawa et al.  (45) Date of Patent: Nov. 25, 2008

(54) VACUUM SWITCHGEAR SYSTEM AND KIT FOR SYSTEM

(75) Inventors: Shuuichi Kikukawa, Hitachi (JP); Kenji Tsuchiya, Hitachi (JP); Satoru Kajiwara, Hitachi (JP); Masato Kobayashi, Hitachi (JP); Yoshiki Sakamoto, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 11/019,415

(22) Filed: Dec. 23, 2004

(65) Prior Publication Data

US 2005/0141176 A1 Jun. 30, 2005

(30) Foreign Application Priority Data

Dec. 26, 2003 (JP) ............................. 2003-433997

(51) Int. Cl.
H02B 7/00 (2006.01)
(52) U.S. Cl. .................. 361/605; 361/602; 218/118; 218/153
(58) Field of Classification Search ................. 361/111, 361/117, 600–621; 218/7, 10–155; 174/542, 174/5 R
See application file for complete search history.

(56) References Cited

U.S. PATENT DOCUMENTS

| | | | | |
|---|---|---|---|---|
| 4,879,441 A * | 11/1989 | Hamm et al. | ................ | 218/119 |
| 5,852,266 A * | 12/1998 | Komuro et al. | ............. | 218/119 |
| 6,156,989 A * | 12/2000 | Miller et al. | ................ | 218/120 |
| 6,232,571 B1 * | 5/2001 | Starck et al. | ................ | 218/153 |
| 6,373,015 B1 | 4/2002 | Marchand et al. | | |
| 6,498,314 B2 * | 12/2002 | Miyo et al. | ................. | 218/118 |
| 6,855,903 B2 * | 2/2005 | Kikukawa et al. | ........... | 218/118 |
| 6,881,917 B2 * | 4/2005 | Kikukawa et al. | ........... | 218/120 |
| 6,884,940 B1 * | 4/2005 | Utsumi et al. | ................ | 174/542 |
| 6,951,993 B2 * | 10/2005 | Kikukawa et al. | ........... | 218/118 |
| 7,135,652 B2 * | 11/2006 | Kobayashi et al. | .......... | 218/155 |
| 2001/0040146 A1 * | 11/2001 | Miyo et al. | ................. | 218/118 |
| 2004/0027791 A1 * | 2/2004 | Marmonier et al. | ......... | 361/602 |
| 2004/0037025 A1 * | 2/2004 | Abe | ........................... | 361/605 |
| 2004/0104201 A1 * | 6/2004 | Sato et al. | .................... | 218/118 |
| 2004/0256360 A1 * | 12/2004 | Kikukawa et al. | ........... | 218/118 |
| 2005/0139579 A1 * | 6/2005 | Sakamoto et al. | ........... | 218/118 |
| 2005/0141176 A1 * | 6/2005 | Kikukawa et al. | ........... | 361/605 |
| 2006/0215356 A1 * | 9/2006 | Takao et al. | ................. | 361/612 |

FOREIGN PATENT DOCUMENTS

| | | |
|---|---|---|
| DE | 10219299 | 2/2004 |
| EP | 0570688 | 11/1993 |
| EP | 1047169 | 10/2000 |
| EP | 1355337 | 10/2003 |
| JP | 2000-268685 | 9/2000 |

* cited by examiner

*Primary Examiner*—Jayprakash N Gandhi
*Assistant Examiner*—Courtney L Smith
(74) *Attorney, Agent, or Firm*—Mattingly, Stanger, Malur & Brundidge, P.C.

(57) ABSTRACT

A vacuum switchgear system, which comprises a plurality of vacuum switchgears each comprising a vacuum container for accommodating the desired number of vacuum switches selected from a disconnecting switch or load break switch, an earth switch and an vacuum circuit breaker. Each of the vacuum switches has connecting terminals. The switchgears constitute different types of switchgears, the switchgears being classified into the power receiving side and power distribution side. The switchgears are connected with the adjoining switchgear or an element selected from an arrester and a PCT by means of an insulated connecting conductor having terminals around both ends thereof. The terminals are electrically connectable with and detachable from the connecting terminals of the switchgears.

15 Claims, 9 Drawing Sheets

VACUUM SWITCHGEAR SYSTEM AND KIT FOR SYSTEM

CLAIM OF PRIORITY

The present application claims priority from the Japanese patent application serial No. 2003-433997, filed on Dec. 26, 2003, the content of which is hereby incorporated by reference into this application.

FIELD OF THE INVENTION

The present invention relates to a vacuum switchgear system and a kit for assembling the system, and more particularly to a vacuum switchgear system comprising a set of predetermined types of switchgears each being disposed in a vacuum container and being connected with other switches and an operator for operating the switchgears, which is suitable for electric power receiving-distribution equipment of an electric power line.

RELATED ART

An electric power receiving-distribution line in the electric power line is provided with switchgears as one element for receiving-distribution equipments. As a switchgear, each of equipments such as an vacuum circuit breaker, a disconnector, etc is connected to each other with a conductor in air and the equipments are insulated in air. In order to downsize the switchgear, gas insulated switchgears using SF6 gas have been used. However, since the switchgears using SF6 gas may give adverse affect on the environment, vacuum insulation switchgears have been proposed.

A vacuum insulation switchgear is disclosed in the patent document 1. The switchgear comprises a vacuum container, a plurality of main circuit switches, accommodated in the vacuum container, each having a fixed electrode and a movable electrode opposite to each other, wherein the movable electrode is connected with a conductor of a bus side, and the fixed electrode is connected with a conductor of a load side. Each of the main circuit switches is covered with an arc shield. Each of the conductors of the bus side is connected by means of flexible conductors. According to the vacuum switchgear, the insulation distance can be shortened and the switchgear can be made compact because of the vacuum insulation.

Patent Document 1: Japanese Patent Laid-Open 2000-268685

In the above-mentioned prior art, since the switchgear accommodates a plurality of switchgear, the switchgear performs all functions necessary for the system. However, in many cases, there are many types of needs according to uses or conditions of the system. If every switchgear is designed to accommodate all elements to perform the all functions for the circuit of the receiving side or distribution side, the switchgear has redundant elements. Further, if each of the switchgear is provided with many elements, the volume of the switchgear becomes large and expensive.

SUMMARY OF THE INVENTION

A subject of the present invention is to provide a vacuum switchgear system and a kit for assembling the system that meet various needs of users by combining different types of vacuum switchgears accommodating a plurality of switches in accordance with the circuit specification.

In order to achieve the subject, the present invention provides a switchgear having a receiving side and a distribution side h wherein each of the vacuum switchgears is a predetermined type having a predetermined function.

In the present invention, there four types of switchgears or three types of switchgears. The plural types of the switchgears constitute a switchgear system in accordance with the users' needs.

In a first type of switchgear system, there are A type switchgear, B type switchgear, C type switchgear and D type switchgear. The first type switchgear system may be used in loop receiving power system, which is mainly used for semiconductor factories, for example. This type of power line is used for the case where power failure is never allowed.

The first type of switchgear system is used in a main line-auxiliary line system.

A second type of switchgear is one circuit receiving system, which may allow the power failure.

The first type of switchgear system comprises A, B, C, and D type switchgears. The second type of switchgear system comprises A, B, and D type switchgears.

The A type switchgear comprises two disconnecting switches or load break switches and one vacuum circuit breaker. The respective disconnecting switches or load break switches are connected with earth switches. Accordingly, the A type switchgear is provided with the five switches in a single vacuum container.

The A type switchgear is used for the power receiving side and has functions; (i) it receives power, (ii) it is associated with an arrester to protect the system from the falling of thunderbolt, (iii) if the receiving lines are two or more, it is connected with the C type switchgear.

The B type switchgear comprises one vacuum circuit breaker associated with an earth switch. It transmits electric power through the vacuum circuit breaker.

The C type switchgear comprises three disconnecting switches or load break switches. The C type switchgear has a function to connect the A type switchgear and a PCT or the D type switchgear and the B type switchgear. If the line is one circuit line, the C type switchgear is not necessary. Each of the disconnecting switches or load break switches is associated with an earth switch.

The D type switchgear comprises two disconnecting switches or load break switches. The disconnecting switches or load break switches are associated with earth switches respectively. The D type switchgear is used on the distribution side. The function of the D type switchgear is to connect with PCT. The A, C type switchgears are used on the receiving side and the B, C and D type switchgears are used on the distribution side, unless the power line is not one circuit line system.

Figure 9:
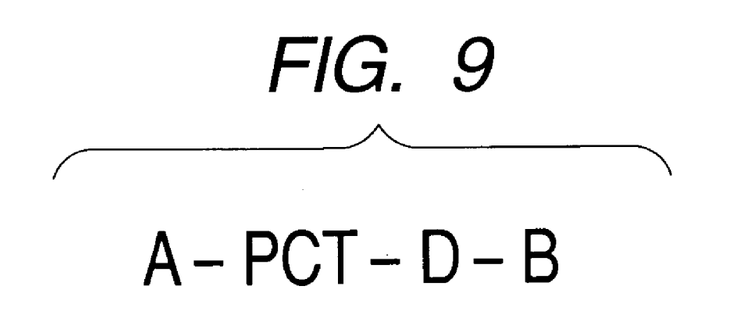
FIG. 9 is a skeleton of a switchgear system for one circuit line of the present invention.
Figure 10:
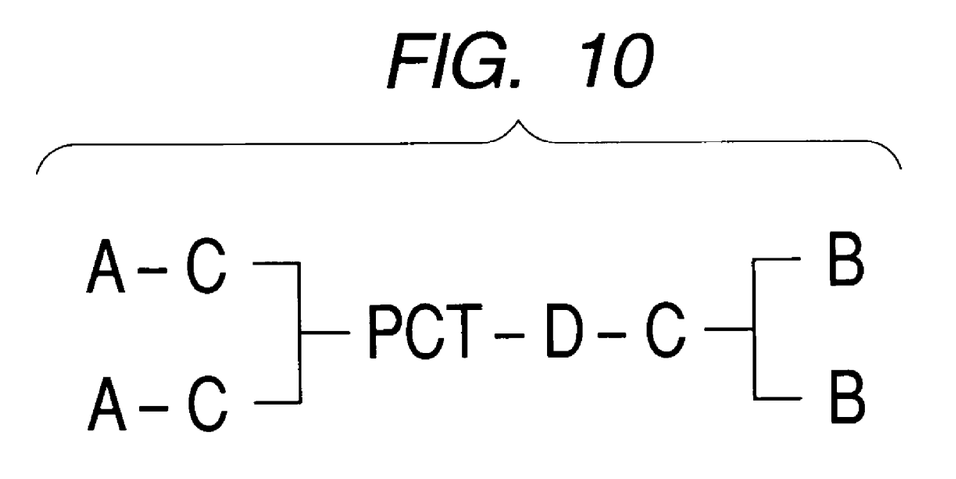
FIG. 10 is a skeleton of a switchgear system for loop receiving line or main line-auxiliary line of the present invention.

In summary, the switchgear systems of the present invention are shown as follows.

i) One circuit line employs a network comprising an A type switchgear, a PCT, a D type switchgear and B type switchgear as shown in FIG. 9.

ii) A loop receiving line or a main line-auxiliary line employs a network comprising a pair of units each comprising an A type switchgear and a C type switchgear, the units being connected with a PCT, which is connected to a D type switchgear and a C type switchgear; the C type switchgear being connected with a pair of B type switchgears in parallel, as shown in FIG. 10.

In the case ii), the number of the C type switchgears on the distribution side is increased in accordance with the number of lines. Accordingly, the number of units of C-2(B) on the distribution side increases as the number of lines.

According to the present invention, not all but important advantages of the present invention may be listed as follows.

(1) It is possible to construct systems in accordance with needs.
(2) Since the number of the elements accommodated in a single vacuum container is small, preferably minimum, the volume of the vacuum container is small. Therefore, the reliability of the switchgear is higher than the conventional integrated vacuum switchgear.
(3) Various switchgear systems can be constructed in accordance with users' needs.
(4) Since only the elements necessary for the circuit are accommodated in a vacuum container, the size of the system can be minimized
(5) Since the unit of the switchgear is constituted by the Small number of elements, the cost is minimized.
(6) Since the size and weight of the switchgears are smaller than the united switchgear such as disclosed in the prior art, assembly of the switchgears is easy.
(7) Since the receiving side and distribution are separated, reliability of the system is very high.
(8) Since the inspection or replace of the elements in the vacuum container is carried out easily, and since only the defect switchgear can be repaired or replaced, the maintenance work and maintenance cost are small.
(9) The above-mentioned advantages of the vacuum switchgear system of the present invention are applied to the gas insulated switchgear system. Since in the gas insulated switchgear system, all elements are accommodated in a single gas container including cables and connecting conductors, the volume and size become remarkably large.

DETAILED DESCRIPTION OF THE PREFERRED EMBODIMENTS

The present invention provides the following embodiments.
(1) A vacuum switchgear system, which comprises a plurality of vacuum switchgears each comprising a vacuum container for accommodating the small number of vacuum switches selected from a disconnecting switch or load break switch, an earth switch and an vacuum circuit breaker. Each of the vacuum switches has connecting terminals, wherein the switchgears constitute different types of switchgears. The switchgears are classified into the power receiving side and power distribution side. The switchgears are connected with the adjoining switchgear or an element selected from an arrester and a PCT by means of an insulated connecting conductor having terminals around both ends thereof, the terminals being electrically connectable and detachable with the connecting terminals of the switchgears.
(2) In the above mentioned vacuum switchgear system, the insulator covering the connecting conductor has a length enough to secure the withstanding resistance voltage between the adjoining vacuum containers and/or the elements.
(3) In the mentioned vacuum switchgear system, the different types of switchgears are: an A type vacuum switchgear having two disconnecting switches or load break switches each being associated with an earth switch and one vacuum circuit breaker; a B type vacuum switchgear having one vacuum circuit breaker associated with an earth switch; a C type vacuum switchgear having three disconnecting switchgears or load break switches each being associated with an earth switch; and a D type vacuum switchgear having two disconnecting switches or load break switches each being associated with an earth switch.
(4) A kit for assembling a vacuum switchgear system comprises: an A type vacuum switchgear having two disconnecting switches or load break switches each being associated with an earth switch and one vacuum circuit breaker; a B type vacuum switchgear having one vacuum circuit breaker associated with an earth switch; a C type vacuum switchgear having three disconnecting switchgears or load break switches each being associated with an earth switch; and a D type vacuum switchgear having two disconnecting switches or load break switches each being associated with an earth switch.
(5) Another type of a kit for assembling a vacuum switchgear comprises an A type vacuum switchgear having two disconnecting switches or load break switches each being associated with an earth switch and one vacuum circuit breaker for a vacuum switchgear system; a B type vacuum switchgear having one vacuum circuit breaker associated with an earth switch; and a D type vacuum switchgear having two disconnecting switches or load break switches each being associated with an earth switch. This kit does not comprise the C type switchgear.
(6) An A type vacuum switchgear for a vacuum switchgear system, which comprises a plurality of vacuum switchgears, having two disconnecting switches or load break switches, wherein each of the disconnecting switches or load break switches is associated with the earth switch and one vacuum circuit breaker.
(7) A B type vacuum switchgear having two disconnecting switches or load break switches each being associated with an earth switch and one vacuum circuit breaker for a vacuum switchgear system, which comprises a plurality of vacuum switchgears.
(8) A C type vacuum switchgear for a vacuum switchgear system, which comprises a plurality of vacuum switchgears, having two disconnecting switches or load break switches and earth switches, wherein each of the two disconnecting switches or load break switches is associated with the earth switch and one vacuum circuit breaker.

(9) A D type vacuum switchgear for a vacuum switchgear system, which comprises a plurality of vacuum switchgears, having two disconnecting switches or load break switches and earth switches, wherein each of the disconnecting switches or load break switches is associated with the earth switch in a vacuum container.

(10) A vacuum switchgear system comprising different types of switchgears each being accommodated in a single vacuum container, wherein the different vacuum switchgears are an A type vacuum switchgear having two disconnecting switches or load break switches each being associated with an earth switch and one vacuum circuit breaker; a B type vacuum switchgear having one vacuum circuit breaker associated with an earth switch; a C type vacuum switchgear having three disconnecting switchgears or load break switches each being associated with an earth switch; and a D type vacuum switchgear having two disconnecting switches or load break switches each being associated with an earth switch.

(11) The vacuum switchgear system according to claim 10, wherein the adjoining vacuum containers and/or an element selected from an arrester and a PCT are electrically, detachably connected by means of an insulated connecting conductor with each other.

(12) The vacuum switchgear system according to claim 10, wherein the switchgear system has a power receiving side and a power distribution side, and the both side being connected through a PCT.

(13) A vacuum switchgear system comprising different types of switchgears each being accommodated in a single vacuum container, wherein the different vacuum switchgears are an A type vacuum switchgear having two disconnecting switches or load break switches each being associated with an earth switch and one vacuum circuit breaker; a B type vacuum switchgear having one vacuum circuit breaker associated with an earth switch; and a D type vacuum switchgear having two disconnecting switches or load break switches each being associated with an earth switch.

(14) In the above mentioned vacuum switchgear system, the adjoining vacuum containers and/or an element selected from an arrester and a PCT are electrically, detachably connected by means of an insulated connecting conductor with each other.

(15) In the above-mentioned vacuum switchgear system, the switchgear system has a power receiving side and a power distribution side, and the both side being connected through a PCT.

Figure 1A:
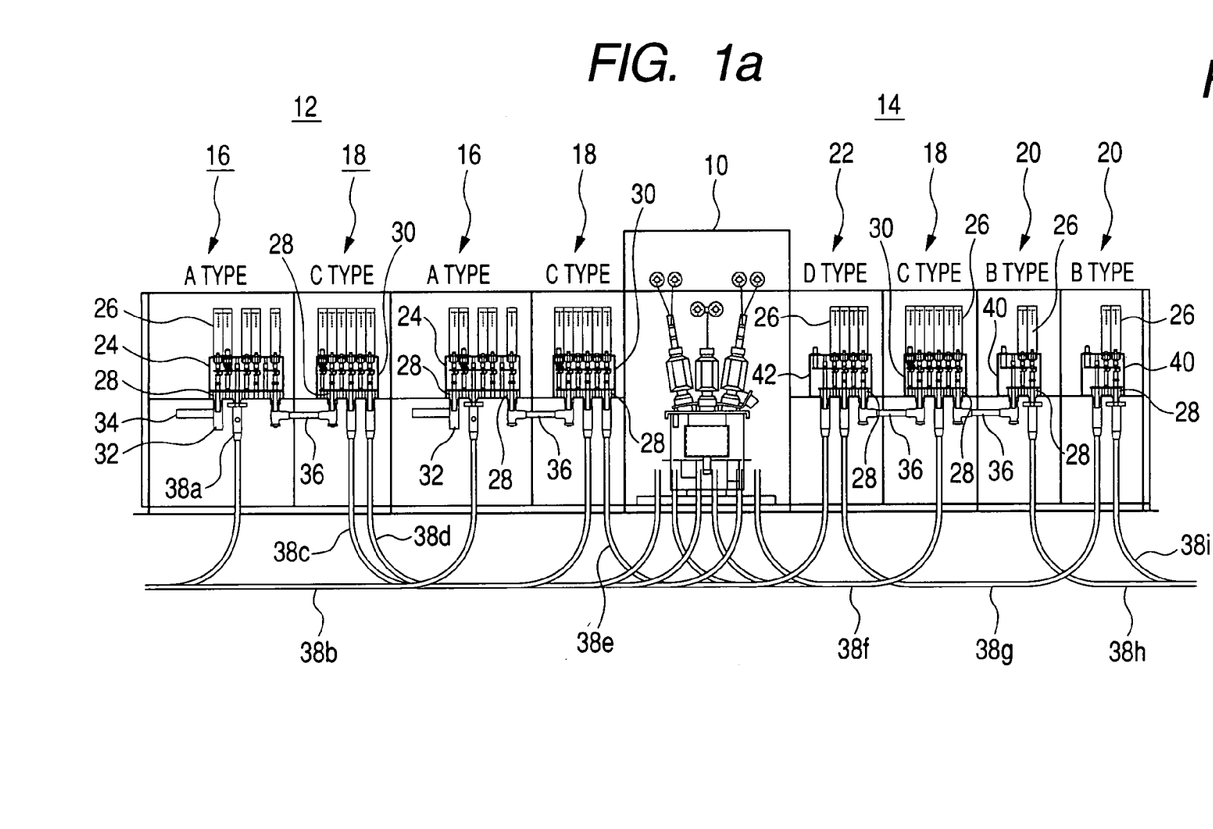
FIG. 1a is a frontal view of is an inner structure of an electric power receiving-distribution equipment using the vacuum switchgear system of the present invention and FIG. 1b shows a side view of the inner structure.
Figure 1B:
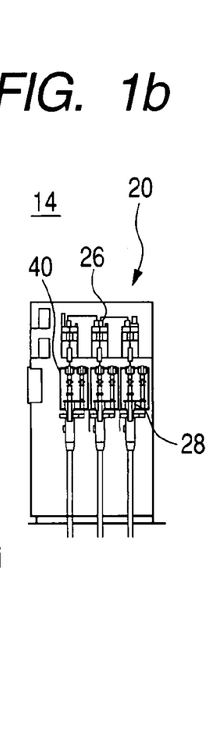
Figure 2:
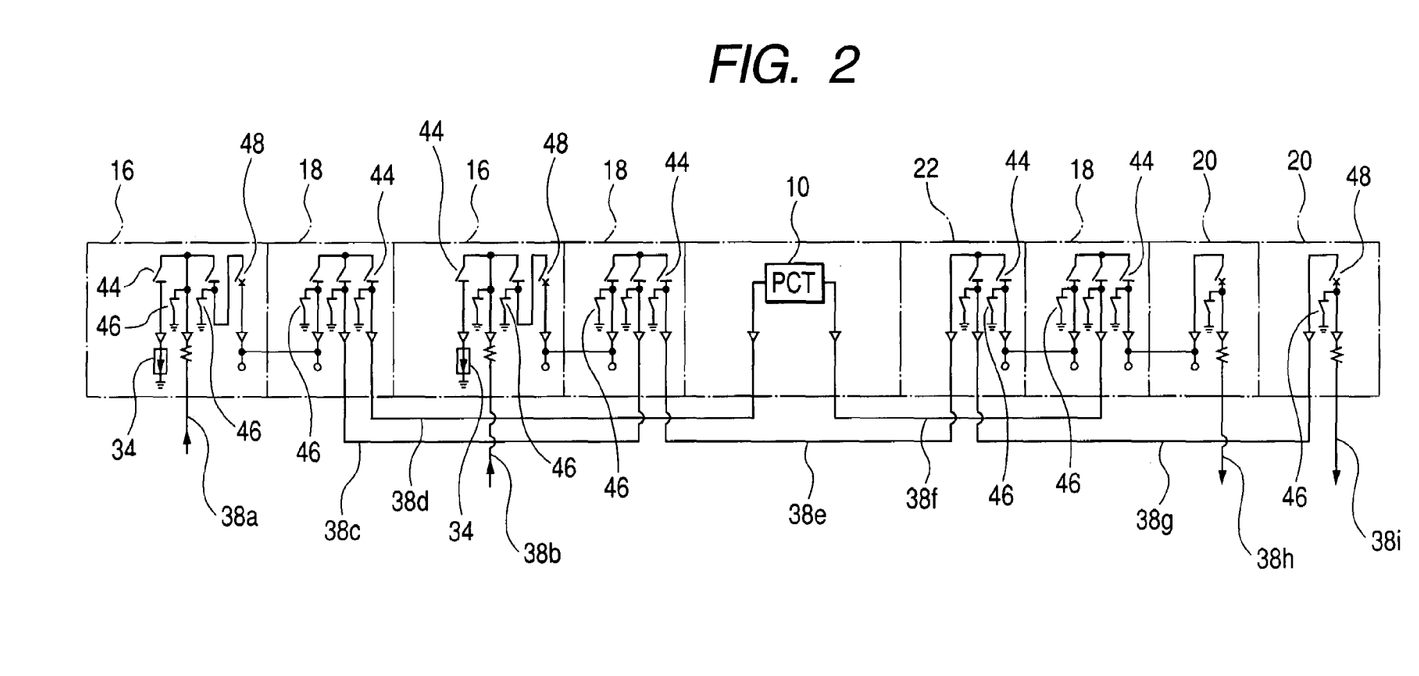
FIG. 2 is a circuit diagram of the electric power receiving-distribution equipment shown in FIG. 1.
Figure 3:
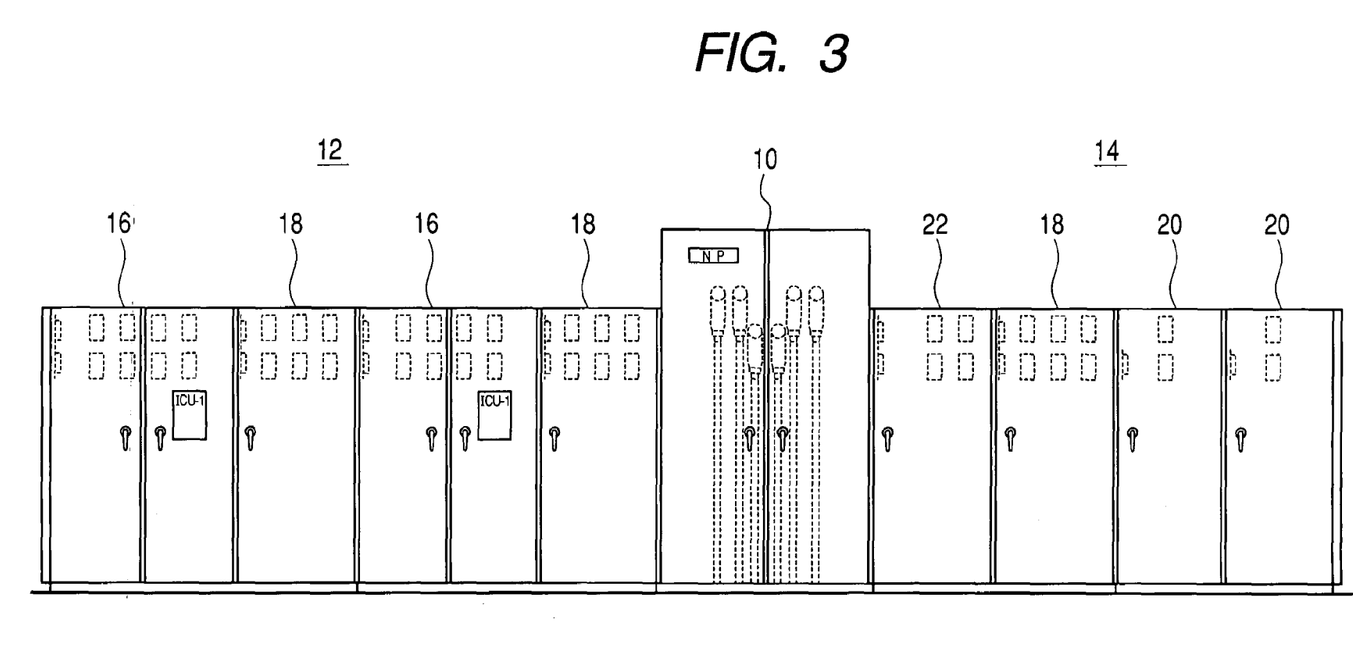
FIG. 3 is a frontal view of the electric power receiving-distribution equipment.

In the following, an embodiment of the present invention will be explained by reference to the drawings. FIG. 1 is an interior diagrammatic view of a electric power receiving-distribution equipment of a vacuum switchgear according to the present invention. FIG. 2 is a circuit network of the electric power receiving-distribution equipment shown in FIG. 1. FIG. 3 is a frontal view of the electric power receiving-distribution equipment shown in FIG. 1.

In FIGS. 1 to 3, the receiving-distribution equipment is constituted by an electric power receiving side switchboard 12 and an electric power distribution side switchboard 14 by means of PCT (potential current transformer) 10. There are arranged a pair of two vacuum switchgears 16, 18 (A type and C type) in accordance with the circuit construction at the power receiving side switchboard 12; and there are three types of switchgears 18, 20, 22 (B type, C type and D type) in the power distribution side switchboard 14.

Each of the A type vacuum switchgears 16 is constituted by a power receiving side vacuum chamber 24, a plurality of operators 26 and a plurality of cable heads 28. Each of the C type vacuum switchgears 18 is constituted by a power receiving side vacuum chamber 30, a plurality of operators 26 and a plurality of cable heads 28. The A type vacuum chamber 16 and C type vacuum chambers 18 are arranged alternately. The specified cable head 28 located at the left side of the switchgear 16 is connected with an arrester 34 through an arrester connecting conductor 32 of which periphery is protected with a solid insulator. The cable head located at the right side of the vacuum chamber is connected with a cable head of the adjoining switchgear through an outer connecting conductor 36 of which is protected with a solid insulator.

The cable head 28 located at the middle of the vacuum switchgear 16 is connected with a conductor of a bus side through cables 38a, 38b of which peripheries are protected by a flexible insulator. The cable head 28 located at the middle of the vacuum switchgear 18 is connected with other switchgears through a cable 38c of which periphery is protected by a flexible insulator. The cable head 28 which is located in the switchgear at the right end is connected with a coil terminal of PCT 10 through the cable 38d of which periphery is protected by a flexible insulator. The cable head 28 located at the right end in the vacuum switchgear 18 next to the PCT 10 is connected with the cable head of the vacuum switchgear 22 through a cable 38e.

On the other hand, the vacuum switchgear 20 of B type at the power distribution side is constituted by a vacuum chamber 40 of the power distribution side, a plurality of operators 26 and a plurality of cable heads 28. The D type switchgear 22 is constituted by a power distribution side vacuum chamber 42, a plurality of operators 26 and a plurality of cable heads 28. The C type vacuum switchgear 18 at the power distribution side has the same construction as that of the C type vacuum switchgear in the power receiving side.

The cable head 28 located at the left end in the vacuum switchgear 18 is connected with cable head 28 of the vacuum switchgear 22 adjoining one through an outer connecting conductor 36. The cable head 28 located at the middle of the vacuum switchgear 18 is connected with a coil terminal of PCT 10 through a cable head 38F. The cable head 28 located at the right end is connected with the cable head 28 of the vacuum switchgear 20 adjoining one through an outer connecting conductor 36. The cable head 28 located at the left end of the D type vacuum switchgear 22 is connected with is connected with the cable 38e. The cable head 28 located in the middle of the D type vacuum switchgear 22 is connected with the cable head 28 of the vacuum switchgear 20 in the right end through the cable 38e. The cable head 28 of each of the vacuum switchgears located at the right end is connected with the load side conductor through the cable 38h, 38i, respectively.

In the power receiving side vacuum chambers 24, 30 for the vacuum switchgears 16, 18 and the power distribution side vacuum chambers 30, 40, 42 for the vacuum switchgears 18, 20, 22, the plural switches and inner conductors connecting the switches are accommodated in accordance with the circuit specification of the receiving side and the distribution side, i.e. the specification of one of two circuit, 3 circuit or four circuit.

Figure 4A:
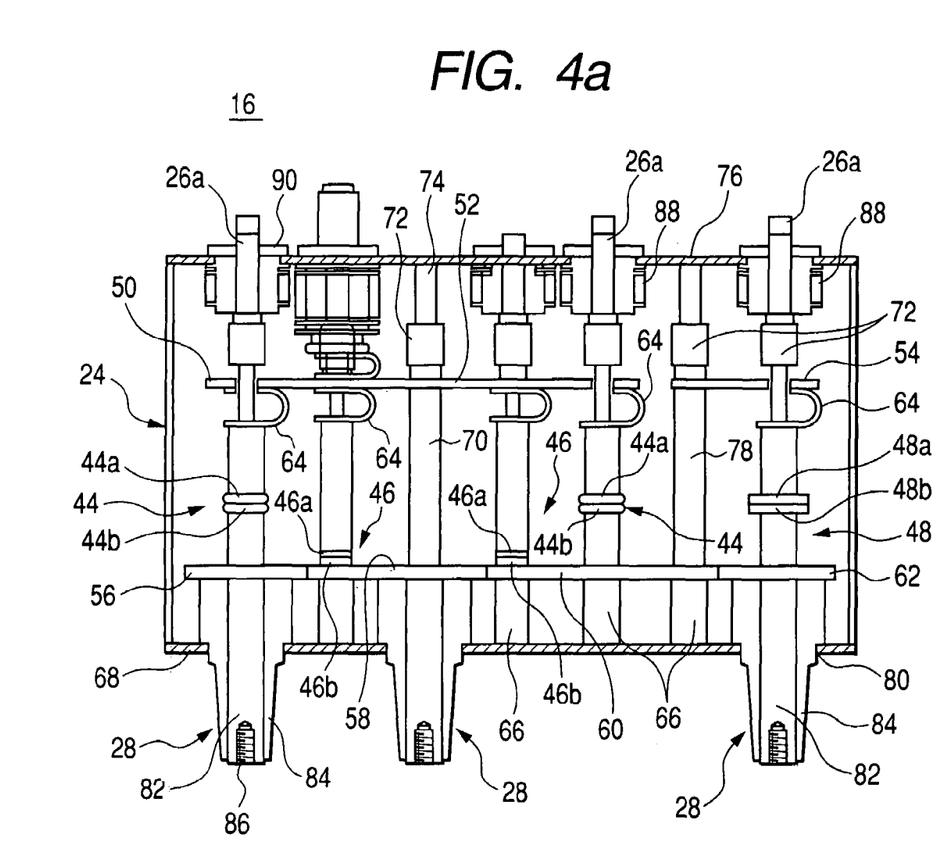
FIG. 4a is a frontal view of an A type vacuum switchgear and FIG. 4b is a side view of the A type vacuum switchgear
Figure 4B:
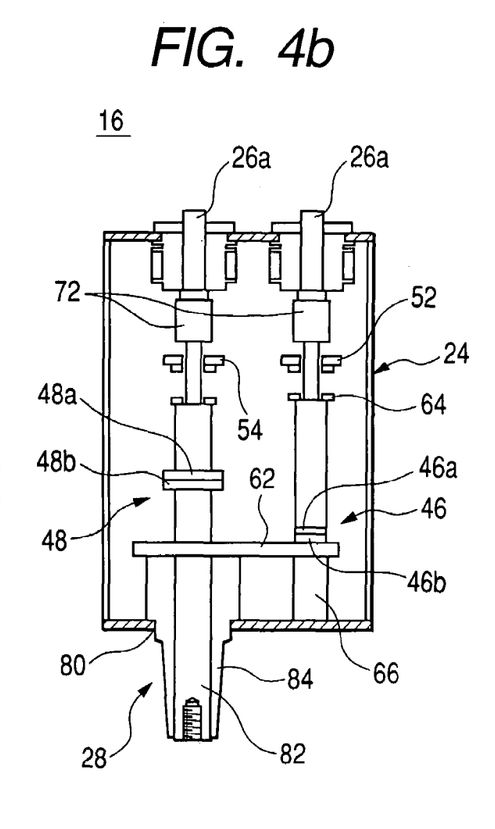

In an example as shown in FIG. 4, a load break switch 44, an earth switch 46 and an vacuum circuit breaker 48 are accommodated in a vacuum chamber in accordance with a circuit specification (circuit structure). Further, inner conductors 50, 52, 54, 56, 58, 60, 62 for connecting each of the switches in accordance with the circuit specification are accommodated in the vacuum chambers.

Each of the pair of load break switches is provided with a movable electrode 44a and a fixed electrode 44b. Each of the movable electrodes 44a is connected with an inner conductor 50 by a flexible conductor 64, and the fixed electrode 44b is connected with an inner conductor 68.

Each of the earth switches 46 is constituted by a movable electrode 46a and the fixed electrode 46b. Each of the movable electrodes 46a is connected with an inner conductor 52 through the flexible conductor 64. The inner conductor 52 is connected with an earth terminal (not shown). One of the fixed electrodes, 46b is connected with the inner conductor 58, and the other is connected with the inner conductor 60. The inner conductor 58 is supported by the lower plate member 68 through a supporting member 66 and is connected with an electrically conductive rod 70. The rod 70 is connected with the inner conductor 50. The upper part of the rod 70 is connected with the upper plate member 78 through the insulating supporting rod 72 and the rod 70.

The vacuum circuit breaker 48 is constituted by the movable electrode 48a and the fixed electrode 48b. The movable electrode 48a is connected with the inner conductor through the flexible conductor 48a. The inner conductor 54 is the inner conductor 60 through the rod 78. The fixed electrode 48b is connected with the inner conductor 62.

The vacuum chamber 24 is provided with one of the load break switches 44, the rod 70 and the cable head 28 corresponding to an vacuum circuit breaker 48. Each of the cable heads 28 fixed to the lower plate member 68 in such a manner that part of the cable head 28 is projected from the vacuum chamber 24 through a hole 80 and insulated from the vacuum chamber 24.

Figure 5A:
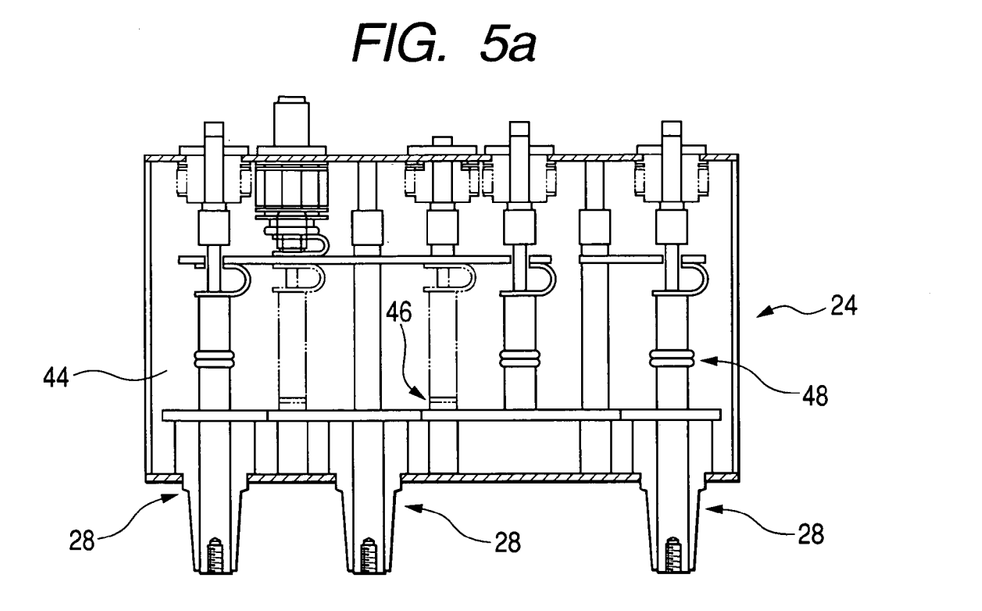
FIG. 5a is a frontal view of a switchgear of the present invention.
Figure 5B:
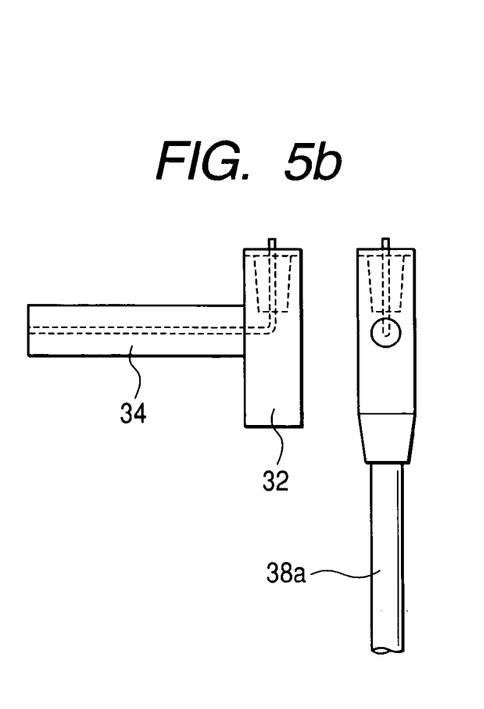
FIG. 5b illustrates relationship among a cable head, a connecting conductor and a cable

The cable head 28 is constituted by a disk form copper conductor 82 and an insulating ceramic bushing 84, which covers the periphery thereof. A screw 86 is formed at the end of the axial direction of the conductor 82. Each of the screws 86 of the cable heads 28 is connectable with the connecting conductor 32, cables 38a to 38i, the screw of the outer connecting conductor 36, as shown in FIG. 5. In other words, the contours of the connecting portions between the connecting conductors 32 and the cables 38a to 38i and between connecting conductors 32 and cable heads 28 of the outer connecting conductors 36 are the same. Accordingly, the connecting conductor 32, the cable heads 38a to 38i and the outer connecting conductors 36 are connectable with any of the cable heads 28.

Figure 5C:
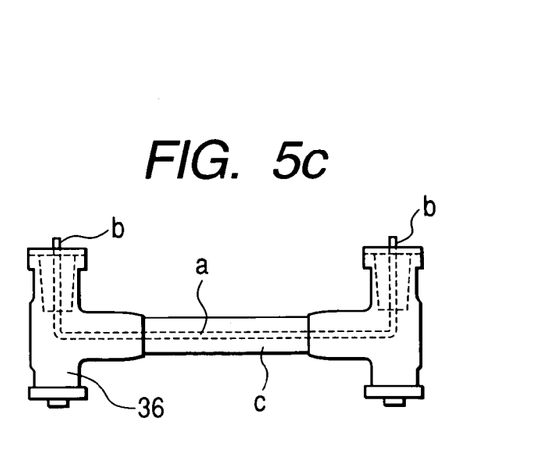
FIG. 5c is a cross sectional view of a connecting conductor used in the present invention.

The outer connecting conductor of which a cross sectional view is shown in FIG. 5c has a conductor a and an insulation cover c made of epoxy resin, for example, The both ends of the conductor a have connecting portions b, which are connectable with and detachable from the cable head 28.

The upper portion of the operating rod 26a is covered with a cylindrical bellows 88 and a dick form base 90; the bellows 88 is fixed to the inner wall of the upper plate member 76 and the bellows 88 is fixed to the surface of the upper plate member 76.

Figure 6A:
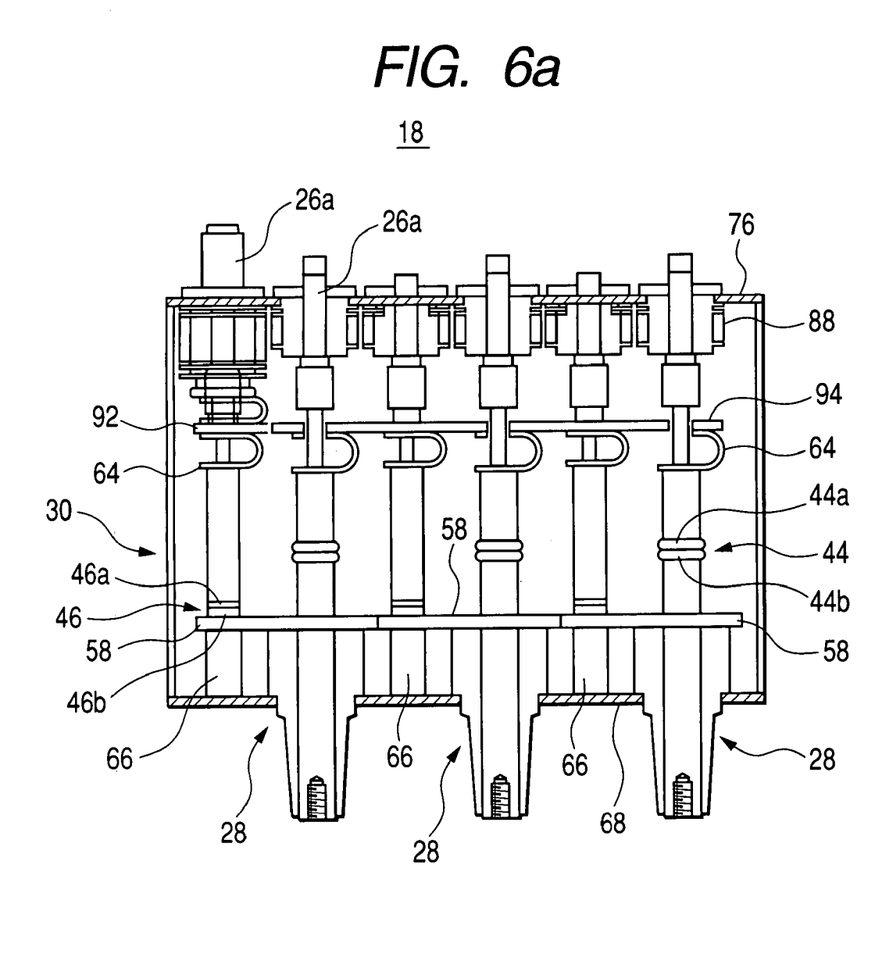
FIG. 6a is a frontal view of an C type vacuum switchgear and FIG. 6b is a side view of the C type vacuum switchgear.
Figure 6B:
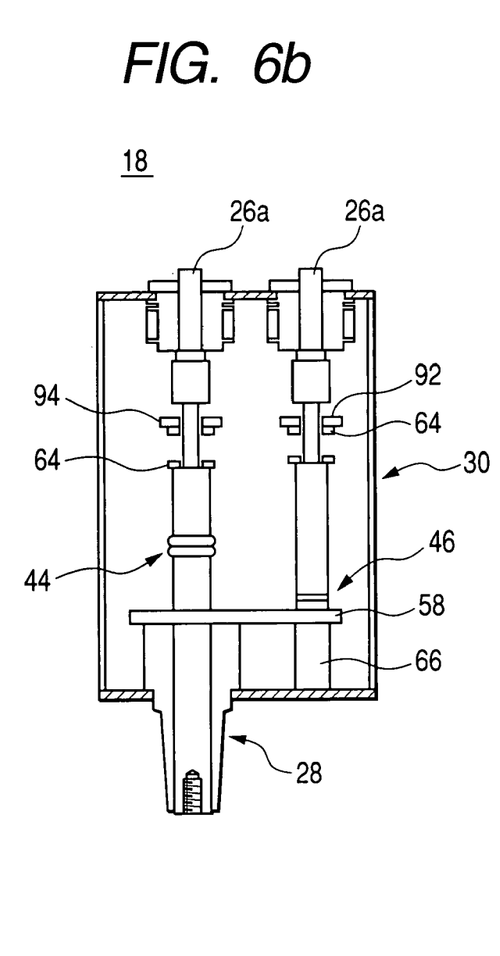

In the vacuum chamber 30 of the vacuum switchgear 18, there are accommodated three load break switches 44, three earth switches 46 and a plurality of inner conductors 58, 92, 94. A movable electrode 46a of each of the earth switches is connected with each other through inner conductor 92; the fixed electrode 46b is connected with a fixed electrode of a joining load break switch 44b through the inner conductor 58. Each of the load break switches 44a is the inner conductor 94 through the flexible conductor 94; the fixed electrode is connected with the conductor 82 of the cable head 28.

Figure 7A:
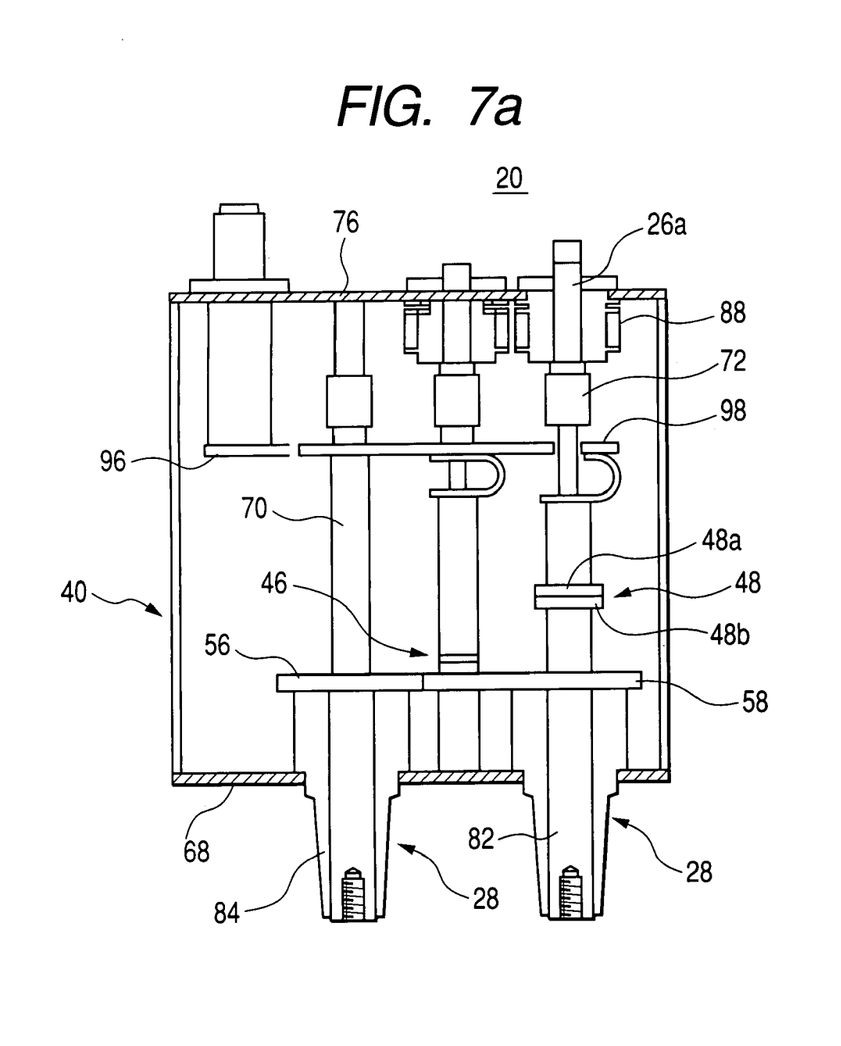
FIG. 7a is a frontal view of a B type vacuum switchgear and FIG. 7b is a side view of the B type vacuum switchgear.
Figure 7B:
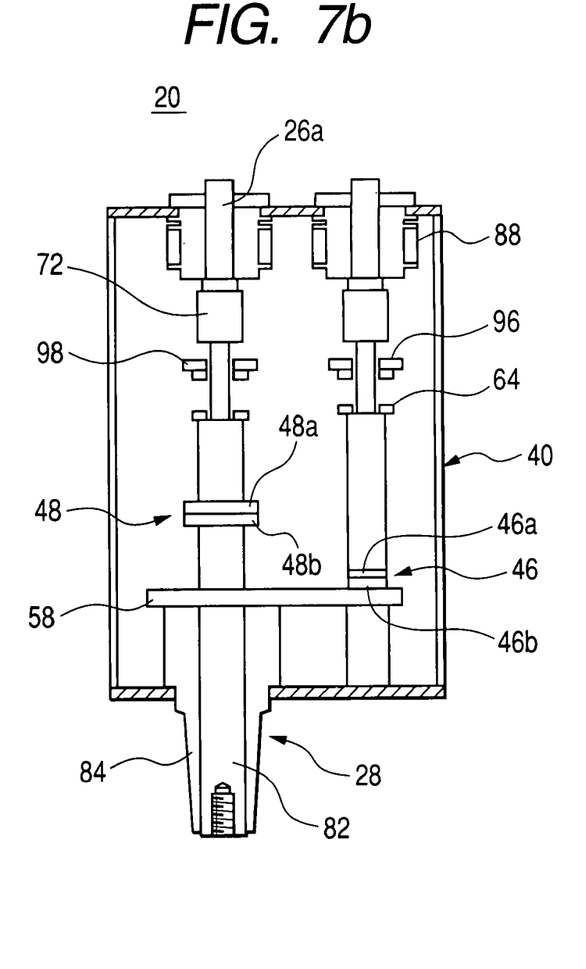
Figure 8A:
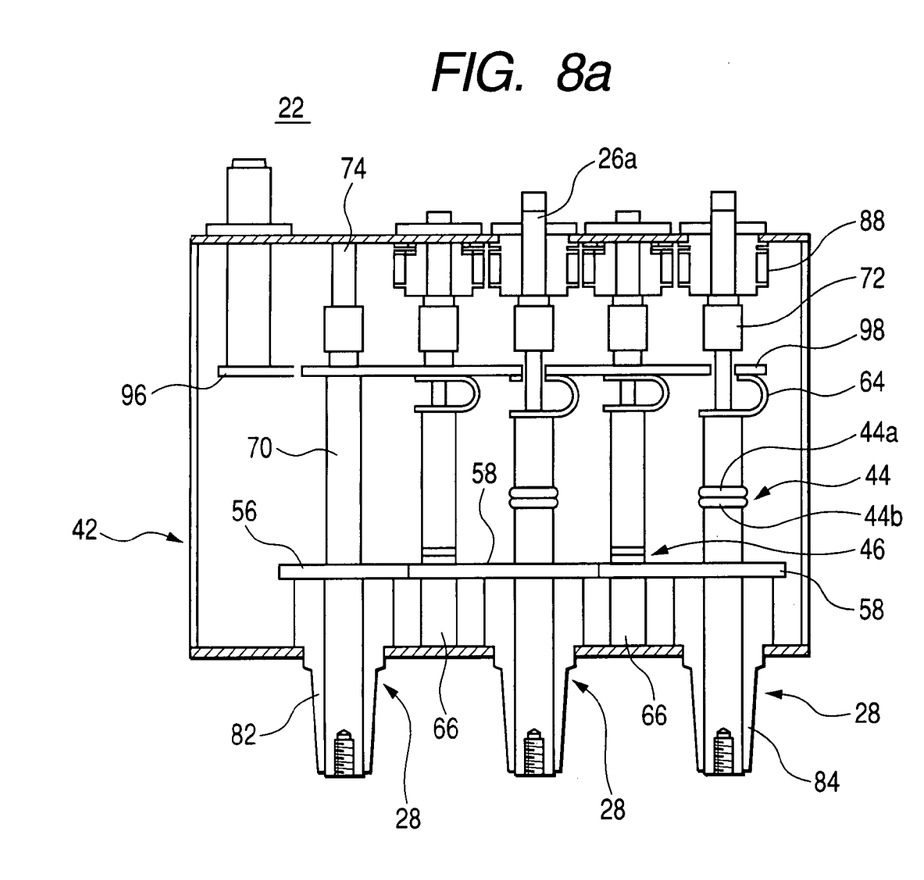
FIG. 8a is a frontal view of a D type vacuum switchgear and FIG. 8b is a side view of the D type vacuum switchgear.
Figure 8B:
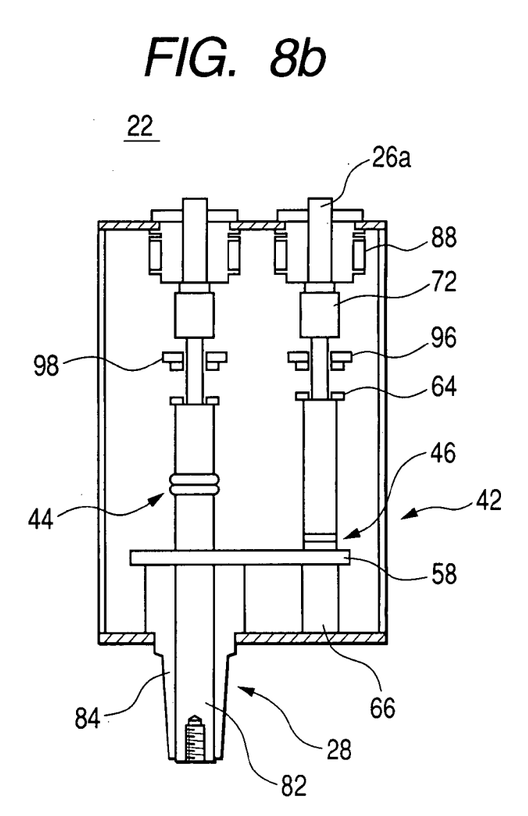

The vacuum chamber 42 of the vacuum switchgear 22 accommodates two earth switches 44, two vacuum circuit breakers 48 and the inner conductors 56, 58, 96, 98, as shown in FIG. 7. The movable electrode 46a of the earth switch 46 is connected with an earth terminal through the flexible conductor 64 and the inner conductor 96. The movable electrode 48a of the vacuum circuit breaker 48 is connected with the conductor 82 of the cable head 28 through the flexible conductor 64, the inner conductor 98 and the rod 70. The fixed electrode 48b is connected with the conductor of the cable head 28 and also connected with the fixed electrode 46b of the earth switch 46 through the inner conductor 58.

The vacuum chamber 42 of the vacuum switchgear 22 accommodates two load break switches 44, two earth switches 46 and the inner conductors 56, 58, 96, 98, as shown in FIG. 7. Each of the movable electrodes 44a of the load break switches 44 is connected with the inner conductor 98 through the flexible conductor 64; the inner conductor 98 is connected with the conductor 82 of the cable head 28 through the rod 70. Each of the fixed electrodes 44b of the load break switches 44 is connected with the fixed electrode 46b of the earth switch 46 and with the conductor of the cable head 28. Each of the movable electrodes 46a of the earth switches 46 is connected with the earth terminal through the flexible conductors 64 and the inner conductors 96.

According to this embodiment, because each of the vacuum chambers 24, 30, 40, 42 of the vacuum switchgears 16, 18, 20, 22 accommodates the load break switches 44, the earth switches 46, the vacuum circuit breakers 48, the inner conductors 50, 54, 56, 58, 60, etc in accordance with the circuit specification, it is possible to meet needs of the users or customers by freely combining the vacuum switchgears in accordance with the circuit specification.

Since each of the switches is accommodated in each of the vacuum chambers 24, 30, 40, 42, the vacuum switchgears can be downsized. Further, the cable heads 28 are connected with the connecting conductors 32, the cable 38a to 38i and the outer connecting conductors 36, it is possible to remove exposed conductive surfaces so that the safety of the vacuum switchgears can be proposed.

Since the contour of the connecting portions between the connecting conductors 32 and the cables 38a to 38i and between the outer connecting conductors and the cables 38a to 38i is the same, it is possible to connect the connecting conductors 32, the cables 38a to 38i and the outer connecting conductors 36 with desired cable heads 28 in accordance with the circuit specification.

Further, according to this embodiment, since the pressure vessels necessary for gas insulated vacuum switch units are not required, the vacuum chambers can be downsized. As a result, the vacuum switchgears and the vacuum switchgear systems can be downsized.

What is claimed is:

1. A vacuum switchgear system, which comprises:
a plurality of vacuum switchgears, at least one of an element selected from an arrester and a PCT, and a plurality of insulated connecting conductors and connecting cables, wherein at least certain of said vacuum switchgears are arranged to be electrically connected with an adjoining one of said vacuum switchgears by one of said connecting conductors and other of said vacuum switchgears are arranged to be electrically connected with a non adjoining one of said vacuum switchgears or said element by one of said cables, each of said connecting conductors and said cables having a respective conductor terminal at each end thereof, each respective conductor terminal being electrically connectable with and detachable from a corresponding terminal of said vacuum switchgear or element to which the conductor terminal is electrically connectable, wherein each of the vacuum switchgears comprises a single vacuum container arranged to accommodate therein a desired number of vacuum switches comprising an earth switch and a switch selected from a disconnecting switch or load break switch, and a vacuum circuit breaker, each of the vacuum switches having a connecting terminal to which the respective conductor terminal is connectable, and a power receiving side and a power distribution side.

2. The vacuum switchgear system according to claim 1, wherein the insulator covering the connecting conductor has a length enough to secure the withstanding resistance voltage between the adjoining vacuum containers or between the adjoining vacuum container and element.

3. The vacuum switchgear system according to claim 1, wherein the different types of switchgears are: an A type vacuum switchgear having two disconnecting switches or load break switches each being associated with an earth switch and one vacuum circuit breaker; a B type vacuum switchgear having one vacuum circuit breaker associated with an earth switch; a C type vacuum switchgear having three disconnecting switchgears or load break switches each being associated with an earth switch; and a D type vacuum switchgear having two disconnecting switches or load break switches each being associated with an earth switch.

4. A kit for assembling the vacuum switchgear system according to claim 1, comprising: an A type vacuum switchgear having two disconnecting switches or load break switches each being associated with an earth switch and one vacuum circuit breaker; a B type vacuum switchgear having one vacuum circuit breaker associated with an earth switch; a C type vacuum switchgear having three disconnecting switchgears or load break switches each being associated with an earth switch; and a D type vacuum switchgear having two disconnecting switches or load break switches each being associated with an earth switch.

5. A kit for assembling the vacuum switchgear according to claim 1, comprising an A type vacuum switchgear having two disconnecting switches or load break switches each being associated with an earth switch and one vacuum circuit breaker for a vacuum switchgear system; a B type vacuum switchgear having one vacuum circuit breaker associated with an earth switch; and a D type vacuum switchgear having two disconnecting switches or load break switches each being associated with an earth switch.

6. An A type vacuum switchgear for the vacuum switchgear system according to claim 1, which comprises a plurality of vacuum switchgears, having two disconnecting switches or load break switches, wherein each of the disconnecting switches or load break switches is associated with the earth switch and one vacuum circuit breaker.

7. A B type vacuum switchgear for a vacuum switchgear according to claim 1, having two disconnecting switches or load break switches each being associated with an earth switch and one vacuum circuit breaker for a vacuum switchgear system, which comprises a plurality of vacuum switchgears.

8. A C type vacuum switchgear for the vacuum switchgear system according to claim 1, which comprises a plurality of vacuum switchgears, having two disconnecting switches or load break switches and earth switches, wherein each of the two disconnecting switches or load break switches is associated with the earth switch and one vacuum circuit breaker.

9. A D type vacuum switchgear for the vacuum switchgear system according to claim 1, which comprises a plurality of vacuum switchgears, having two disconnecting switches or load break switches and earth switches, wherein each of the disconnecting switches or load break switches is associated with the earth switch in a vacuum container.

10. A vacuum switchgear system comprising different types of switchgears each being accommodated in a single vacuum container, wherein the different types of vacuum switchgears are an A type vacuum switchgear having two disconnecting switches or load break switches each being associated with an earth switch and one vacuum circuit breaker; a B type vacuum switchgear having one vacuum circuit breaker associated with an earth switch; a C type vacuum switchgear having three disconnecting switchgears or load break switches each being associated with an earth switch; and a D type vacuum switchgear having two disconnecting switches or load break switches each being associated with an earth switch, and a plurality of insulated connecting conductors and connecting cables, wherein at least certain of said vacuum switchgears are arranged to be electrically connected with an adjoining one of said vacuum switchgears by one of said connecting members and other of said vacuum switchgears are arranged to be electrically connected with a non adjoining one of said vacuum switchgears by one of said cables, each of said connecting conductors and said cables having a respective conductor terminal at each end thereof, each respective conductor terminal being electrically connectable with and detachable from a corresponding terminal of said vacuum switchgear to which the conductor terminal is electrically connectable.

11. The vacuum switchgear system according to claim 10, further comprising:

at least one of an element selected from an arrester and a PCT, wherein one of said vacuum containers is electrically, detachably connected to said element by an insulated connecting conductor.

12. The vacuum switchgear system according to claim 10, wherein the switchgear system has a power receiving side and a power distribution side, both sides being connected together through a PCT.

13. A vacuum switchgear system comprising different types of switchgears each being accommodated in a single vacuum container, wherein the different types of vacuum switchgears are an A type vacuum switchgear having two disconnecting switches or load break switches each being associated with an earth switch and one vacuum circuit breaker; a B type vacuum switchgear having one vacuum circuit breaker associated with an earth switch; and a D type vacuum switchgear having two disconnecting switches or load break switches each being associated with an earth switch; and a plurality of insulated connecting conductors and cables, wherein at least certain of said vacuum switchgears are arranged to be electrically connected with an adjoining one of said vacuum switchgears by one of said connecting members and other of said vacuum switchgears are arranged to be electrically connected with an non adjoining one of said vacuum switchgears by one of said cables, each of said connecting conductors and said cables having a respective conductor terminal at each end thereof, each respective conductor terminal being electrically connectable with and detachable from a corresponding terminal of said vacuum switchgear to which the conductor terminal is electrically connectable.

14. The vacuum switchgear system according to claim 13, further comprising:
    at least one of an element selected from an arrester and a PCT,
    wherein one of said vacuum containers is electrically, detachably connected to said element by an insulated connecting conductor.

15. The vacuum switchgear system according to claim 13, wherein the switchgear system has a power receiving side and a power distribution side, both sides being connected together through a PCT.

* * * * *